United States Patent
Bihani et al.

(10) Patent No.: US 10,303,777 B2
(45) Date of Patent: May 28, 2019

(54) LOCALIZATION PLATFORM THAT LEVERAGES PREVIOUSLY TRANSLATED CONTENT

(71) Applicant: Netflix, Inc., Los Gatos, CA (US)

(72) Inventors: Ballav Bihani, Fremont, CA (US); Vidyalakshmi Vilathur Sundaram, Cupertino, CA (US); Prosenjit Bhattacharyya, Half Moon Bay, CA (US); Jose Moreno, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 137 days.

(21) Appl. No.: 15/231,725

(22) Filed: Aug. 8, 2016

(65) Prior Publication Data

US 2018/0039622 A1    Feb. 8, 2018

(51) Int. Cl.
    *G06F 17/28* (2006.01)
(52) U.S. Cl.
    CPC ........ *G06F 17/289* (2013.01); *G06F 17/2836* (2013.01); *G06F 17/2854* (2013.01)
(58) Field of Classification Search
    CPC ............................. G06F 17/289; G06F 17/2854
    USPC ............................................................. 704/2
    See application file for complete search history.

(56) References Cited

U.S. PATENT DOCUMENTS

| | | | | |
|---|---|---|---|---|
| 8,050,906 B1 * | 11/2011 | Zimmerman | ....... | G06F 17/2836 704/2 |
| 2003/0149557 A1 * | 8/2003 | Cox | .................. | H04M 3/42229 704/2 |
| 2009/0076792 A1 * | 3/2009 | Lawson-Tancred | ......................... | G06F 17/212 704/2 |
| 2009/0282033 A1 * | 11/2009 | Alshawi | ............ | G06F 17/30967 |
| 2010/0185434 A1 * | 7/2010 | Burvall | ................. | G06F 17/289 704/3 |
| 2010/0223048 A1 * | 9/2010 | Lauder | ................ | G06F 17/2836 704/4 |

(Continued)

FOREIGN PATENT DOCUMENTS

| EP | 2317447 A1 * | 5/2011 | ......... G06F 17/2836 |
|---|---|---|---|
| EP | 2317447 A1 | 5/2011 | |
| GB | 2433403 A | 6/2007 | |

OTHER PUBLICATIONS

"Language Localization", Wikipedia.com, retreived Sep. 11, 2018.*
International Search Report for Application No. PCT/US2017/044991 dated Oct. 24, 2017.

*Primary Examiner* — Edwin S Leland, III
(74) *Attorney, Agent, or Firm* — Artegis Law Group, LLP

(57) ABSTRACT

One embodiment of the present invention sets forth a technique for translating textual content. The technique includes receiving a request to translate an element of source text from an origin language to a target language and searching a database for an element of matching text in the origin language that at least partially matches the element of source text. The technique further includes, if an element of matching text is found in the database, then reading from the database an element of previously translated text that is mapped to the element of matching text and includes at least one word that is translated into the target language, and transmitting the element of source text, the element of matching text, and the element of previously translated text to a location for translation, or if an element of matching text is not found in the database, then transmitting the element of source text to the location for translation.

20 Claims, 8 Drawing Sheets

(56) References Cited

U.S. PATENT DOCUMENTS

| | | | |
|---|---|---|---|
| 2012/0016655 A1* | 1/2012 | Travieso | G06F 17/2827 704/2 |
| 2014/0075004 A1* | 3/2014 | Van Dusen | H04L 41/04 709/223 |
| 2014/0278429 A1* | 9/2014 | Ganong, III | G10L 15/26 704/260 |
| 2015/0120273 A1* | 4/2015 | Gusakov | G06F 17/289 704/2 |
| 2015/0199337 A1* | 7/2015 | Park | G06F 17/289 704/2 |
| 2015/0378989 A1* | 12/2015 | Wu | G06F 17/289 704/3 |
| 2016/0283204 A1* | 9/2016 | Zaiwei | G06F 9/454 |
| 2017/0293611 A1* | 10/2017 | Tu | G06F 3/0482 |
| 2018/0034773 A1* | 2/2018 | Petry | H04L 63/10 |
| 2018/0039622 A1* | 2/2018 | Bihani | G06F 17/2854 |
| 2018/0061274 A1* | 3/2018 | Frahling | G09B 19/06 |
| 2018/0137108 A1* | 5/2018 | Martinez Corria | G06F 17/2854 |
| 2018/0253326 A1* | 9/2018 | Arseniev | G06F 9/454 |

* cited by examiner

LOCALIZATION PLATFORM THAT LEVERAGES PREVIOUSLY TRANSLATED CONTENT

BACKGROUND OF THE INVENTION

Field of the Invention

The present invention relates generally to computer science and, more specifically, to a localization platform that leverages previously translated content.

Description of the Related Art

Text localization is the process of translating and otherwise adapting written content to a language or dialect specific to a country or region. Because machine translation algorithms are generally unable to accurately translate idioms or accommodate the differences in linguistic typology that are invariably present between any two languages, there are many applications for which manual translations by linguists are still mandatory. For example, with respect to software applications, software menus, legal documents, and customer service communications, even a small error in translation can have a serious negative impact on the utility and/or quality of the software, document, or service that includes the incorrectly translated text.

However, manual translation is typically a time-consuming, error-prone, and long cycle-time process that is difficult to scale efficiently. Consequently, for business processes that rely on large volumes of textual content to be translated on a weekly or daily basis, the time and costs associated with manually translating so much textual content can be significantly burdensome. For example, web-based vendors that serve an international customer base may have very large daily or weekly translation needs that must be met quickly and accurately to avoid customer satisfaction issues and to drive international sales. Without the ability to provide high-quality translations quickly and inexpensively, such businesses can suffer dramatically.

As the foregoing illustrates, what is needed in the art are more effective approaches to translating textual content.

SUMMARY OF THE INVENTION

One embodiment of the present invention sets forth a technique for translating textual content. The technique includes receiving a request to translate an element of source text from an origin language to a target language and searching a database for an element of matching text in the origin language that at least partially matches the element of source text. The technique further includes, if an element of matching text is found in the database, then reading from the database an element of previously translated text that is mapped to the element of matching text and includes at least one word that is translated into the target language, and transmitting the element of source text, the element of matching text, and the element of previously translated text to a location for translation, or if an element of matching text is not found in the database, then transmitting the element of source text to the location for translation.

At least one advantage of the disclosed techniques is that for new textual content that requires translation, previously translated textual content can be leveraged in an automated process to reduce or eliminate how much manual translation of the new textual content is needed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
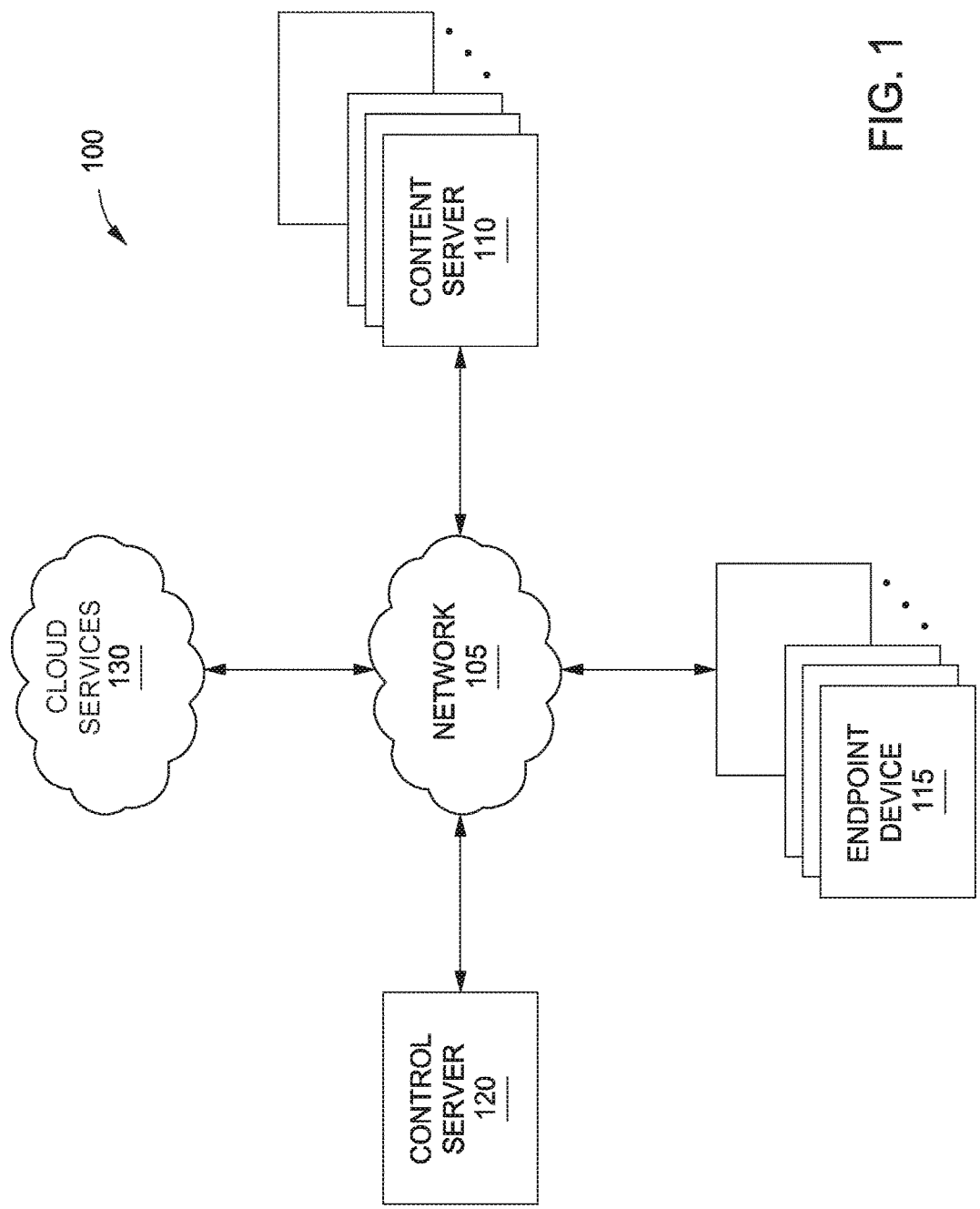
FIG. 1 illustrates a network infrastructure configured to implement one or more aspects of the present invention.

FIG. 1 illustrates a network infrastructure 100, according to various embodiments of the invention. As shown, the network infrastructure 100 includes content servers 110, control server 120, and endpoint devices 115, each of which are connected via a communications network 105. Network infrastructure 100 is configured to distribute content to content servers 110, and such content is then distributed on demand to endpoint devices 115.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various files that are tracked and managed by the control server 120. Each content server 110 may further communicate with cloud services 130 and one or more other content servers 110 in order "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the cloud services 130 may include an online storage service (e.g., Amazon® Simple Storage Service, Google® Cloud Storage, etc.) in which a catalog of files, including thousands or millions of files, is stored and accessed in order to fill the content servers 110. Cloud services 130 also may provide compute or other processing services. Although only a single cloud services 130 is shown in FIG. 1, in various embodiments multiple cloud services 130 may be implemented.

Figure 2:
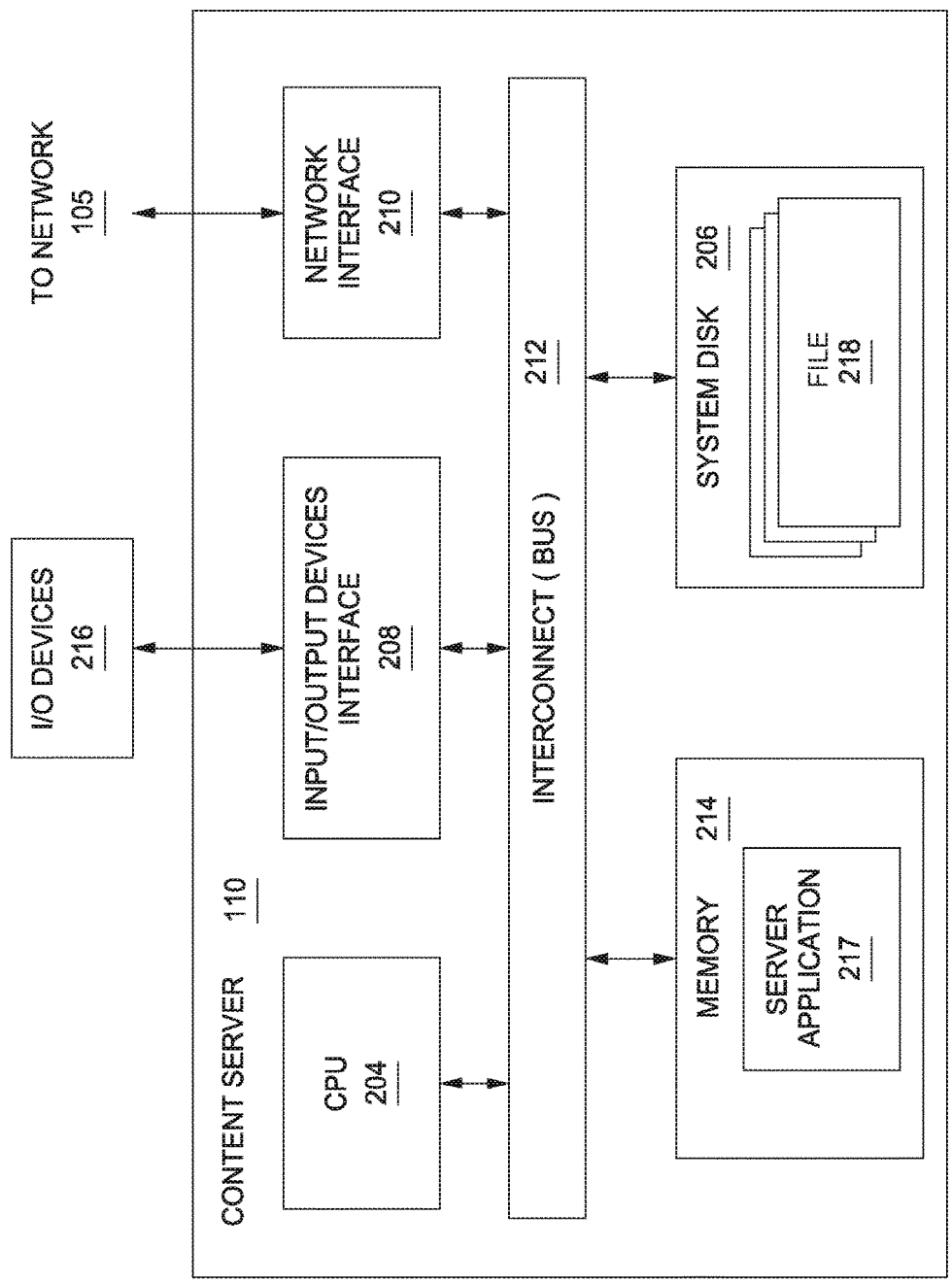
FIG. 2 is a more detailed illustration of the content server of FIG. 1, according to various embodiments of the present invention.

FIG. 2 is a more detailed illustration of content server 110 of FIG. 1, according to various embodiments of the present invention. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218 can then be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105.

Files 218 include a plurality of digital visual content items, such as videos and still images. In addition, files 218 may include textual content associated with such digital visual content items, such as movie metadata. For a particular digital visual content item, files 218 may include multiple translations of such textual content, so that users in different countries can interact with or request the particular digital visual content item regardless of the preferred language of the user.

Figure 3:
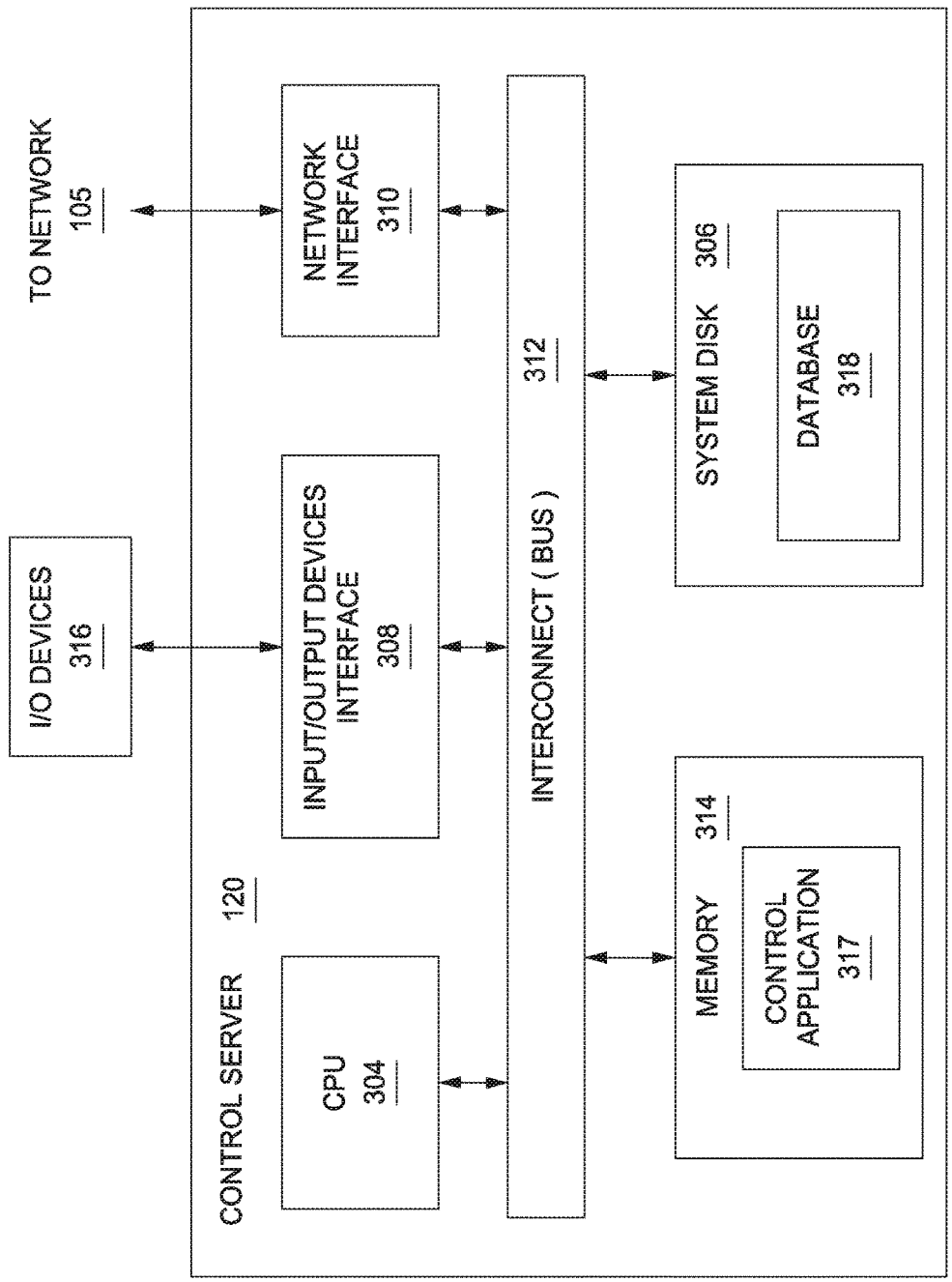
FIG. 3 is a more detailed illustration of the control server of FIG. 1, according to various embodiments of the present invention.

FIG. 3 is a more detailed illustration of control server 120 of FIG. 1, according to various embodiments of the present invention. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the cloud services 130, and the files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115.

Figure 4:
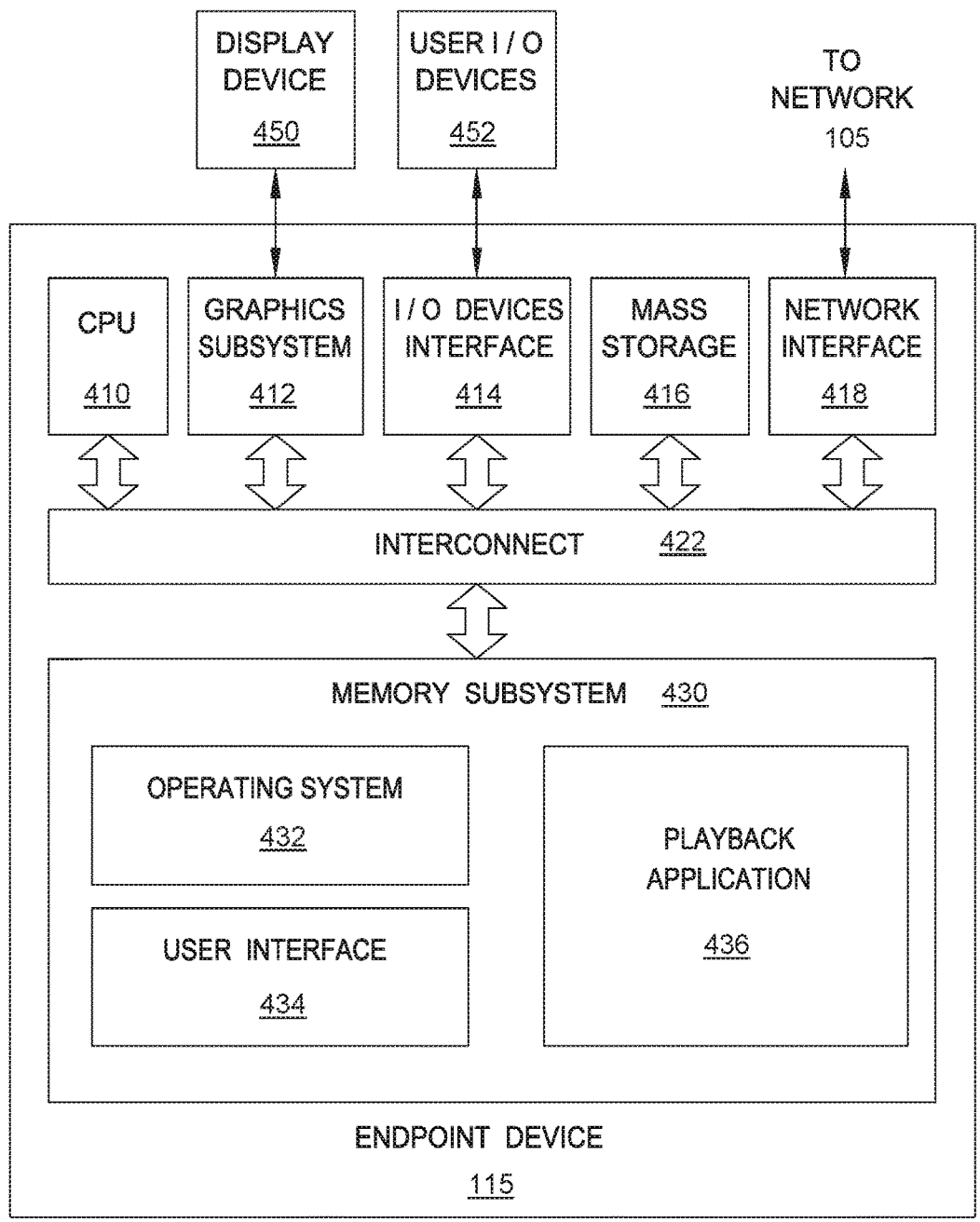
FIG. 4 is a more detailed illustration of the endpoint device of FIG. 1, according to various embodiments of the present invention.

FIG. 4 is a more detailed illustration of the endpoint device 115 of FIG. 1, according to various embodiments of the present invention. As shown, the endpoint device 115 may include, without limitation, a CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418, and memory subsystem 430.

In some embodiments, the graphics subsystem 412 is configured to generate frames of video data and transmit the frames of video data to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one of more buttons, a keyboard, and a mouse or other pointing device. The I/O device interface 414 also includes an audio output unit configured to generate an electrical audio output signal. User I/O devices 452 includes a speaker configured to generate an acoustic output in response to the electrical audio output signal. In alternative embodiments, the display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, mass storage unit 416, I/O device interface 414, and graphics subsystem 412. The operating system 432 also provides process and memory management models for the user interface 434 and the playback application 436. The user interface 434, such as a window and object metaphor, provides a mechanism for user interaction with endpoint device 115. Persons skilled in the art will recognize the various operating systems and user interfaces that are well-known in the art and suitable for incorporation into the endpoint device 108.

In some embodiments, the playback application 436 is configured to request and receive content from the content server 105 via the network interface 418. Further, the playback application 436 is configured to interpret the content and present the content via display device 450 and/or user I/O devices 452.

Localization Platform

According to various embodiments of the present invention, new textual content that needs to be localized is translated via an automated or fully automated approach, in which previously translated textual content is leveraged to minimize or eliminate the need for manual translation of the new textual content. In some embodiments, a localization platform receives textual content for translation, leverages previously translated textual content to reduce manual translation workload, acts as an interface with linguists who perform any needed manual translation, and returns translated textual content to the application requesting the translated textual content. One such embodiment is illustrated in FIG. 5.

Figure 5:
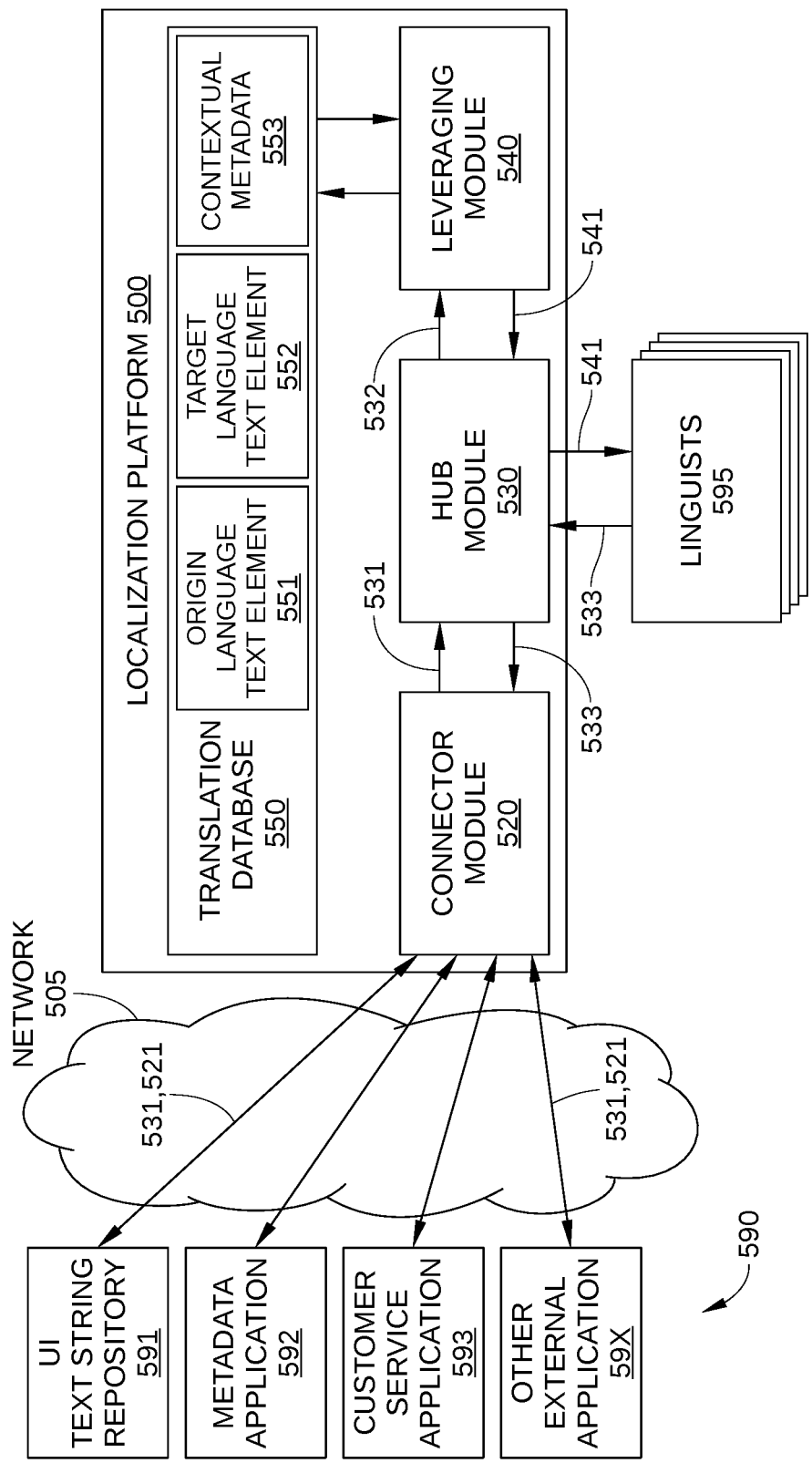
FIG. 5 is an illustration of a localization platform configured to generate translated content for the network infrastructure of FIG. 1, according to various embodiments of the present invention.

FIG. 5 is an illustration of a localization platform 500 configured to generate translated content for the network infrastructure of FIG. 1, according to various embodiments of the present invention. Localization platform 500 facilitates the localization of textual content to provide a high quality user experience, for example for an end user associated with an endpoint device 115 of network infrastructure 100 in FIG. 1. Ideally, such an end user has a similar high quality experience, regardless of the country of residence of the user or the preferred language of the user. Consequently, user interactions with network infrastructure 100 that include a textual element, such as e-mails, graphical user interface (GUI) text strings, etc., should be presented in the preferred language of the user. For example, in embodiments in which network infrastructure 100 is involved in the distribution of digital entertainment content, such as video streaming, the localized textual content generated by localization platform 500 may include movie metadata (e.g., movie synopsis, cast information, sub-titles, etc.), marketing material, and strings used in customer-facing applications.

In general, localization platform 500 is configured to leverage previously translated textual content to partially or fully automate the translation of new textual content. As shown, localization platform 500 is communicatively coupled to one or more external applications 590 and linguists 595 via a network 505, and includes a connector module 520, a hub module 530, a leveraging module 540, and a translation database 550. Network 505 may be any technically feasible communications or information network, wired or wireless, that allows data exchange, such as a wide area network (WAN), a local area network (LAN), a wireless (WiFi) network, and/or the Internet, among others.

External applications 590 are source systems for localization platform 500 that employ localized content, such as textual content that is specific to a particular location or country. Therefore, external applications 590 send requests for translations of textual content to localization platform 500 and/or have textual content for translation that are periodically pulled by localization platform 500. External applications 590 may include, without limitation, a user interface (UI) text string repository 591, a metadata application 592, a customer service application 593, and one or more additional external applications, such as marketing applications, legal applications, and the like. Each of external applications 590 is an application that employs textual content that varies depending on the location in which the textual content is employed.

UI text string repository 591 may include the most current text strings for a user interface by which a user associated with a particular endpoint device 115 can interact with network infrastructure 100. One embodiment of such a user interface is user interface 434 in FIG. 4. Whenever a text string in the primary language is added to UI text string repository 591, or an existing text string in the primary language is modified, the new or modified text string needs to be translated into each language supported by network infrastructure 100, then provided to UI text string repository 591. In this way, a consistent UI with the same menus, explanations, and the like, is presented for all users, regardless of user location and preferred language. Thus, UI text string repository 591 may request specific text strings to be translated, either periodically, or whenever such a change in the current text strings is detected.

Metadata application 592, customer service application 593, and other external applications may similarly request specific text strings to be translated. Metadata application 592 is configured to provide movie-specific data to end users, such as a movie synopsis, cast information, and the like. Customer service application 593 is configured to generate electronic responses, such as e-mails, to customer queries. Thus, metadata application 592 and customer service application 593 each rely on up-to-date text strings that are available in all languages supported by network infrastructure 100.

Connector module 520 is configured to connect with external applications 590 to receive requests for textual content to be translated and/or pulls textual content for translation from external applications 590. In the latter case, connector module 520 queries each of external applications 590 for textual content to be translated in an automated process, such as periodic polling of each of external applications 590. In some embodiments, the frequency of polling for each external application may be unique. For example, connector module 520 may query metadata application 592 every few minutes or hours when a daily program is under production and new metadata associated with the daily program are generated on an on-going basis. By contrast, connector module 520 may query customer service application 593 only once per week to determine whether new text for customer bulk delivery e-mails has been generated. Connector module 520 passes textual content received for translation, such as electronic documents 531, to hub module 530, and returns translated textual content received from hub module 530 on to the appropriate requesting external application 590. In some embodiments, connector module 520 receives a translated job 533 from hub module 530 and generates a translated electronic document 521 that is returned to the appropriate requesting external application 590.

Hub module 530 is configured to drive workflows within localization platform 500. In particular, hub module 530 is configured to facilitate completion of translation jobs by acting as a hub between connector module 520, linguists 595, and leveraging module 540. For example, in some embodiments, hub module 530 associates a particular project with each of external applications 590, and a given electronic file 531 (or set of files) received from one of external applications 590 is considered a particular translation job 532 within the project associated with that external application 590. In such embodiments, each file 531 may be a word-processing file, spreadsheet, properties file (or property resource bundle), or any other electronic document that is employed by one or more of external applications 590 and includes textual content strings.

Hub module 530 transmits each translation job 532 to leveraging module 530 for leveraging (described below), receives a leveraged translation job 541 from leveraging module 540, makes the leveraged version of the translation job 541 available for downloading by one or more linguists 595, and receives translated jobs 533 uploaded by linguists 595. Thus, hub module 530 is configured as the human interface for localization platform 500 for outputting files that include textual content for translation, such as files in an XML Localization Interchange File Format (XLIFF), and receiving files that include textual content that has been translated, such as XLIFF files. Hub module 530 then transmits received translated jobs 533 to connector module 520 for transmission to the appropriate external application 590. In some embodiments, hub module 530 first transmits the translated jobs 533 received from linguists 595 to leveraging module 540 for a quality check prior to transmitting received translated jobs 533 to connector module 520.

Leveraging module 540 is configured to perform various function that enable the leveraging of previously translated textual content to eliminate, minimize, or otherwise reduce the need for manual translation of source text that is in an origin language and is requested to be translated into one or more target languages. Specifically, leveraging module 540 is configured to extract textual content from electronic documents included in a translation job 532; segment such textual content into smaller and more easily matched text elements; search translation database 550 for matching text elements; perform a matching score analysis for matching text elements; perform quality checks on translated content received from linguists 595, and update translation database 550 with newly translated content. The above functions are described in greater detail below in conjunction with FIGS. 6 and 7.

Translation database 550 includes a continuously updated repository of text elements that are in an origin language, for example English. For each such origin language text element 551, translation database 550 includes one or more target language text elements 552, each in a different target language, that corresponds to the origin language text element 551. The one or more corresponding target language text elements 552 may each be previously translated textual content that a linguist has translated from the origin language text element 551. In addition, for each origin language text element 551, translation database 550 includes contextual metadata 553, which may include any contextual information associated with a particular origin language text element 551. As described below in greater detail, contextual metadata 553 that is associated with a particular origin language text element 551 may be employed for determining whether a particular text element from an electronic document 531 is an in-context match of the particular origin language text element 551.

By way of illustration, localization platform 500 is illustrated conceptually as a single entity in FIG. 5, however, in some embodiments, localization platform 500 may be implemented as a distributed computing system across multiple computing devices. In a similar vein, connector module 520, hub module 530 and/or leveraging module 540 may each be configured as a service that is distributed over multiple machines, so that the functionality of any one of connector module 520, hub module 530 and/or leveraging module 540 is not vulnerable to a single point of failure. Furthermore, the various functions of localization platform 500 that are divided between connector module 520, hub module 530 and leveraging module 540 may be combined into a single service, or rearranged between multiple additional services, and are not limited the configuration illustrated in FIG. 5.

Leveraging Previously Translated Content in a Localization Platform

Figure 6:
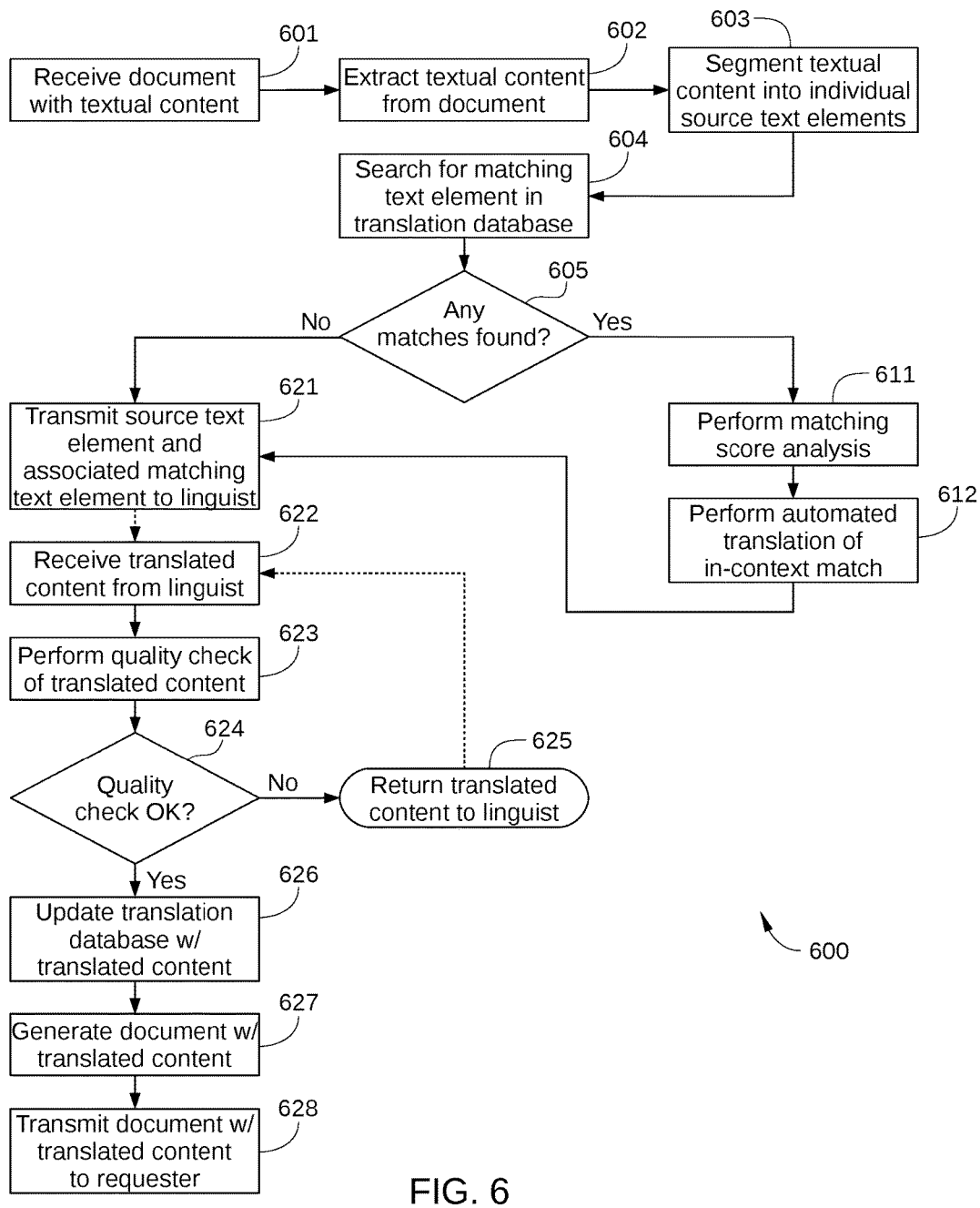
FIG. 6 sets forth a flowchart of method steps for translating textual content, according to various embodiments of the present invention.

FIG. 6 sets forth a flowchart of method steps for translating textual content, according to various embodiments of the present invention. Although the method steps are described with respect to the systems of FIGS. 1-5, persons skilled in the art will understand that any system configured to perform the method steps, in any order, falls within the scope of the present disclosure.

As shown, a method 600 begins at step 601, in which connector module 520 receives an electronic file 531 that includes textual content for translation, as shown in FIG. 5. Upon receipt of electronic file 531, connector module 520 transmits electronic file 531 to hub module 530. Hub module 530 assigns a job identifier to electronic file 531 and transmits electronic file 531 as translation job 532 to leveraging module 540 for further processing prior to translation.

In step 602, leveraging module 540 extracts textual content from the document. Because each of external applications 590 may send a different type of electronic file to localization platform 500 for translation, leveraging module 540 is configured to recognize the particular file type of electronic file 531, and accordingly extract textual content from electronic file 531 that needs to be translated. In some embodiments, electronic file 531 includes metadata, header information, or some other indicator for what portions of electronic file 531 are textual content that need to be translated. In other embodiments, leveraging module 540 is configured to determine what portions of electronic file 531 are textual content that need to be translated.

In step 603, leveraging module 540 segments the textual content extracted in step 602 into individual text elements, or elements of source text. In some embodiments, an element of source text is a single sentence or phrase from electronic file 531. Thus, in step 603, a paragraph of textual content extracted from electronic file 531 is generally separated into separate sentences, each sentence being a text element that can be checked for matches in translation database 550. Because larger blocks of text are broken into such elements of source text, there is more likely to be matching text in translation database 550 that exactly or substantially matches each element of source text. Each heading, phrase, title block, and other sentence fragments can also be segmented as a single element of source text.

In step 604, leveraging module 540 searches for matching text elements in translation database 550 for each element of source text extracted from electronic file 531. In some embodiments, a particular text element in translation database 550 is considered a matching text element when the element of source text extracted from electronic file 531 and the particular text element in translation database 550 share a minimum number of words or letters. Thus, a text element in translation database 550 may be considered a matching text element even when not an exact word-for-word match of the element of source text extracted from electronic file 531. Any technically feasible text searching algorithm may be employed in step 604.

In some embodiments, when no matches are found for a particular element of source text, the text searching algorithm may be configured to transform one or more words in the element of source text to make further matches possible. For example, verb case and/or tense may be transformed, plural nouns may be transformed to singular nouns or vice-versa etc.

In step 605, leveraging module 540 determines whether a matching text element has been found for one or more of the elements of source text associated with electronic file 531. If yes, method 600 proceeds to step 611; if no, method 600 proceeds to step 621.

In step 611, leveraging module 540 performs a matching score analysis for each element of source text from an electronic file 531 for which one or more matching text elements were found in step 604. The matching score analysis generates at least one matching score for each element of source text for which one or more matching text elements were found in step 604. Thus, there may be multiple matching scores associated with a single electronic file 531, one corresponding to each element of source text for which a matching text element has been found. The matching score for a particular matching text element found in translation database 550 quantifies how closely the element of source text extracted from electronic file 531 matches that matching text element. In some embodiments, for a given element of source text, a matching score analysis may be performed for multiple matching text elements, and the matching text element with the best matching score will be considered in subsequent steps.

In some embodiments, in step 611, leveraging module 540 determines whether each matching text element found in step 604 for electronic file 531 is an exact match or an "in-context match" of the corresponding element of source text extracted from electronic file 531. An exact match is typically a word-for-word or character-for-character match of the element of source text of interest. By contrast, an "in-context match" is generally defined as a word-for-word or character-for-character match of a matching text element with the element of source text of interest, in which the matching text element also shares identical or very similar context with the element of source text in question. In some embodiments, for in-context matches, the element of source text is automatically replaced with the matching text element, thereby avoiding the manual translation of the element of source text.

In some embodiments, the above-described matching score for each matching text element includes metadata or any other indicator that designates the matching text element as an in-context match of the element of source text, an exact out-of-context match of the element of source text, or a fuzzy match of the element of source text. In such embodiments, the element of matching text may be designated as one of multiple levels of fuzzy match with the element of source text, e.g., a high-fuzzy match, a medium-fuzzy match, a low-fuzzy match, etc.

Any technically feasible scoring algorithm may be employed in step 610 to quantify how closely an element of source text extracted from electronic file 531 matches a matching text element found in translation database 550. In some embodiments, a fuzzy match algorithm is employed in step 611. One such embodiment is described below in conjunction with FIG. 7. After the matching score analysis of step 611 is completed for each element of source text for which a matching text element was found, method 600 proceeds to step 612.

In step 612, any elements of source text for which an in-context match is found in translation database 550 are automatically replaced with a matching text element that is determined to be an in-context match. That is, in step 612, an automated translation of in-context matches determined in step 611 is performed. Method 600 then proceeds to step 621.

In step 621, hub module 530 transmits to a particular linguist 595 one or more elements of source text of electronic file 531, an associated matching text element (i.e., an origin language text element 551), if one was found in step 604, and the element of previously translated text that corresponds to the matching text element (i.e., a target language text element 552). In some embodiments, the one or more elements of source text of electronic file 531, the corresponding origin language text element 551, and the target language text element 552 are included an XLIFF file. The XLIFF file format is an XML-based format that standardizes how localizable data are passed between tools, such as computer-aided translation (CAT) tools, during a localization or translation process.

In some embodiments, a matching score or other matching metadata are also transmitted to the linguist 595 in step 621, and may be included in the same XLIFF file in which the elements of source text are transmitted to the linguist

595. In such embodiments, leveraging module 540 generates a leveraged translation job 541 or a portion of a leveraged translation job 541. A leveraged translation job 541 includes, for each element of source text to be translated that has a corresponding element of matching text, a matching score and/or other matching metadata. Thus, when a linguist 595 receives a leveraged version of a translation job 541, the linguist 595 receives not only a particular element of source text to be translated, a corresponding origin language text element 551, and a target language text element 552, but also a matching score and/or other matching metadata. The matching score and/or other matching metadata further describe the relationship between the element of source text and the matching text element (i.e., the origin language text element 551). As a result, a linguist 595 can see whether the matching text element is an exact word-for-word match with the element of source text, or if the matching text element is merely a so-called "fuzzy match," in which most but not all words match those in the element of source text. Furthermore, in some embodiments, such matching metadata can indicate what portions of the matching text element is not an exact match to the element of source text and why those portions are not considered an exact match. Thus, based on such matching metadata, a linguist 595 can quickly determine what portion of a text element is most likely in need of being modified.

In some embodiments, all elements of source text extracted from electronic file 531 are sent to the same linguist 595 for translation, for example in a single XLIFF file as a single leveraged version of a translation job 541. In other embodiments, for example when electronic file 531 includes a large quantity of textual content for translation, different portions of the elements of source text associated with electronic file 531 are sent to different respective linguists 595 as separate leveraged translation jobs 541. For example, in such embodiments, all elements of source text associated with a particular paragraph may be sent to one linguist 595, and all elements of source text associated with a different paragraph may be sent to a different linguist 595.

In embodiments in which the elements of source text extracted from a particular electronic file 531 are separated into multiple leveraged versions of translation jobs 541, the elements of source text extracted from the particular electronic file 531 may be separated into different translation jobs based on translation statistics that are compiled as part of the matching score analysis of step 611. Such translation statistics may include for the particular electronic file 531 and for each element of source text associated with electronic file 531: the total number of words to be translated; how many words are an exact match; how many words are a high-fuzzy match, a medium-fuzzy match, and a low-fuzzy match; and the like. Thus, as part of step 621, hub module 530 may generate multiple leveraged translation jobs 541 for a particular electronic file 531, each being transmitted to a different linguist 595.

It is noted that for an electronic file 531 for which no matching text elements are found in step 605, complete manual translation of the text elements extracted from electronic file 531 will ultimately be performed by one or more linguists 595. In such cases, the leveraged translation job 541 does not include a matching score, matching metadata, a matching text element, or a previously translated text that corresponds to the matching text element.

In step 622, hub module 530 receives a translated job 533 uploaded by a linguist 595, where translated job 533 includes translated content for a particular leveraged translation job 541.

In step 623, leveraging module 540 performs a quality check of the translated content included in the leveraged translation job 541 received in step 622. For example, in some embodiments, leveraging module 540 performs one or more error checks to confirm that common human errors have not been made by the linguist 595. When such an error is detected, the leveraged translation job 541 is returned to the appropriate linguist 595 for correction.

One error check that can be made in step 623 is to confirm that for each element of source text, a corresponding newly translated text element is not identical or substantially the same as the element of source text. Such high similarity between the origin language text element and the target language text element strongly implies that the linguist failed to complete or even begin the translation. Another error check that can be made in step 623 is to confirm that the language of each newly translated text element is in the target language. Another error check that can be made in step 623 is that the word count of each newly translated text element is within an acceptable range of the word count of the corresponding element of source text. Another error check that can be made in step 623 is a spell check of each newly translated text element. Yet another error check that can be made in step 623 is a sentiment analysis of each newly translated text element, where the overall sentiment of each newly translated text element is compared to the overall sentiment of the corresponding element of source text.

In step 624, leveraging module 540 determines whether each newly translated text element in the translated job 533 has passed all error and/or quality checks. If no, method 600 proceeds to step 625; if yes, method 600 proceeds to step 626.

In step 625, connector module 520 returns translated content to linguist 595, since one or more newly translated text elements in translated job 533 have failed to pass the quality check of step 622.

In step 626, leveraging module 540 updates translation database 550 with newly translated textual content. Specifically, leveraging module 540 updates translation database 550 to include each element of source text in leveraged translation job 541 that was not an exact, in-context match of an existing entry in translation database 550. The element of source text is included in translation database 550 as an origin language text element 551. In addition, for each such element of source text, leveraging module 540 includes the element of newly translated text in translated job 533, where the newly translated text from translated job 533 is included in translation database 550 as a target language text element 552. Furthermore, leveraging module 540 updates translation database 550 to include a mapping of the element of source text to the element of newly translated text, i.e., each origin language text element 551 is mapped to one or more target language text elements 552 in translation database 550. As a result, as translation requests are completed by localization platform 500, translation database 550 is continuously updated with new origin language text elements 551 and corresponding target language text elements 552.

In some embodiments, when a new origin language text element 551 and corresponding target language text elements 552 are added to translation database 550 in step 626, leveraging module 540 also updates translation database 550 with contextual metadata 553. The contextual metadata 553 is associated with the origin language text element 551 being added to translation database 550, and may include any contextual information associated with the origin language text element 551. For example, and without limitation, contextual metadata 553 may include textual content immediately preceding and/or immediately following the origin language text element 551 in the electronic file 531 from which the element of source text (i.e., origin language text element 551) is extracted. Additionally or alternatively, contextual metadata 553 may include other contextual information associated with the element of source text and/or the electronic file 531 from which the element of source text is extracted. For example, contextual metadata 553 may include a document type of electronic file 531, a particular movie or TV show referenced by electronic file 531, and the like. Contextual metadata 553 for a particular origin language text element 551 can then be employed subsequently for determining whether a text element from a different electronic document 531 is an in-context match of the particular origin language text element 551 or just an exact match.

In step 627, hub module 530 generates a document w/translated content, such as a translated electronic document 521. Hub module 530 then posts back the translated electronic document 521 to the external application 590 that originally requested the translation.

In step 628, connector module 520 transmits the document generated in step 627 to the external application 590 that originally requested the translation.

Implementation of method 600 enables the translation of textual content in a partially automated or fully automated fashion. A translation job is segmented into multiple text elements that are individually more likely to be exactly or somewhat matched by a previously translated text element. As a result, most or all text elements of the translation job may partially or exactly match a previously translated text element in translation database 550, and the previously translated text is then provided to a linguist 595 to assist in the manual translation process.

Figure 7:
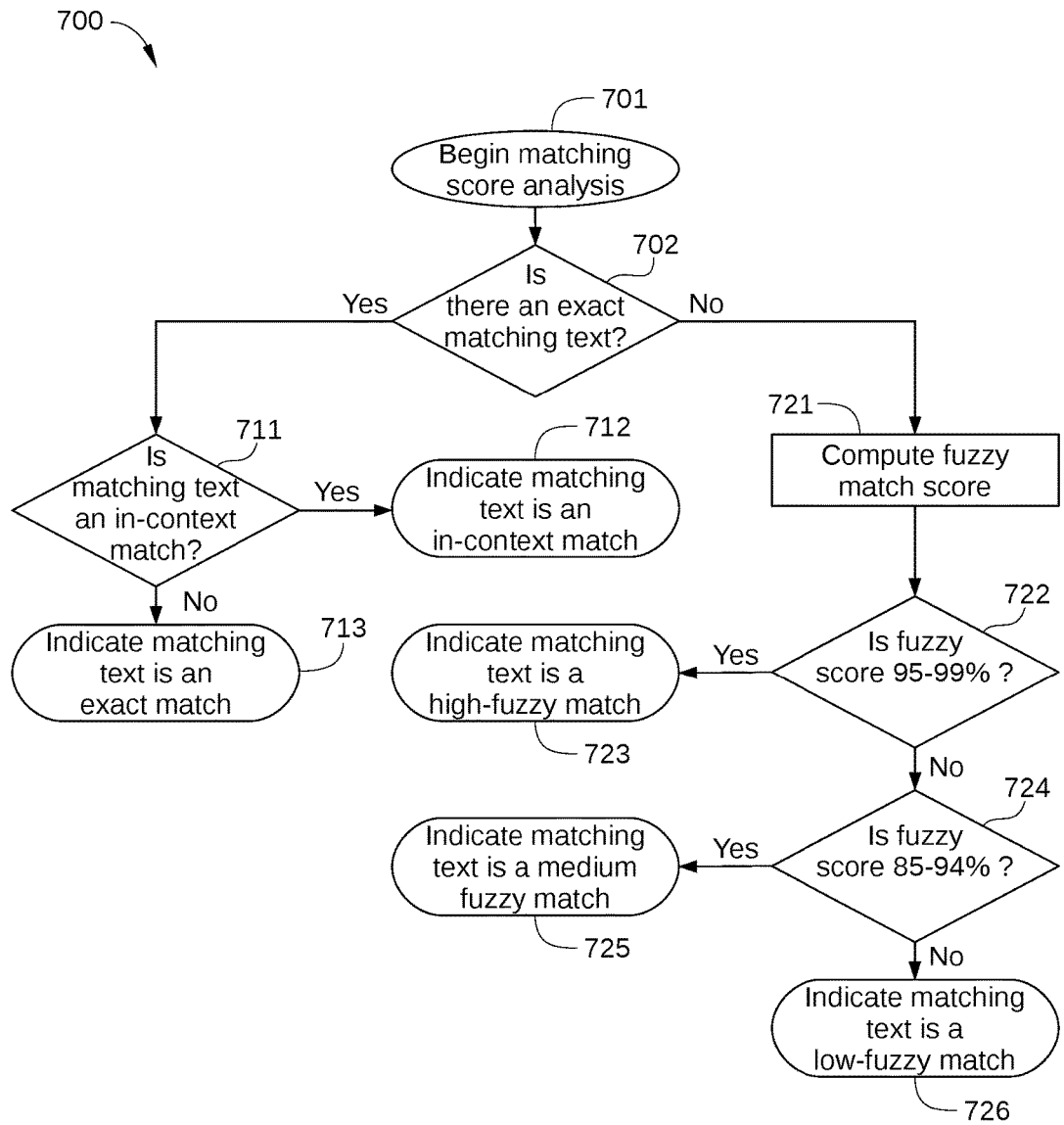
FIG. 7 sets forth a flowchart of method steps for performing a matching score analysis, according to various embodiments of the present invention.

FIG. 7 sets forth a flowchart of method steps for performing a matching score analysis, according to various embodiments of the present invention. Although the method steps are described with respect to the systems of FIGS. 1-5, persons skilled in the art will understand that any system configured to perform the method steps, in any order, falls within the scope of the present disclosure. In some embodiments, the method steps of FIG. 7 are performed as part of step 611 of method 600, described above.

As shown, a method 700 begins at step 701, in which leveraging module 540 begins a matching score analysis for one of the matching text elements found for a particular element of source text associated with a particular electronic file 531.

In step 702, leveraging module 540 determines whether the matching text element is an exact match of the element of source text of interest. If yes, method 700 proceeds to step 711; if no, method 700 proceeds to step 721. An exact match may be a word-for-word or a character-for-character match of the element of source text of interest.

In step 711, leveraging module 540 determines whether the matching text element is an in-context match of the element of source text of interest. If yes, method 700 proceeds to step 712; if no, method 700 proceeds to step 713. An in-context match may be a word-for-word or character-for-character match of a matching text element with an element of source text, where the matching text element also shares identical or very similar context with the element of source text. The determination of step 711 may be based on suitable contextual metadata 553 that are stored in translation database 550 and are associated with the matching text element.

In step 712, leveraging module 540 indicates that the matching text element is an in-context match of the element of source text. For example, metadata associated with the matching text element may be updated accordingly, so that the element of source text can be directly replaced by the matching text element via an automated process.

In step 713, leveraging module 540 indicates that the matching text element is an exact match of the element of source text. For example, metadata associated with the matching text element may be updated, so that a linguist 595 who receives the element of source text for translation will also receive the matching text element and the metadata indicating that the matching text element is an exact match, but not an in-context match. Thus, the linguist 595 may only have to confirm that the contextual differences between the element of source text and the matching text element do not bear on the translation of the element of source text, in which case the linguist 595 can simply replace the element of source text with the matching text element.

In step 721, leveraging module 540 computes a fuzzy match score for the matching text element, for example using a fuzzy match score application. The fuzzy match score may be based on an edit distance between the element of source text and the matching text element, i.e., on a minimum number of operations required to transform the element of source text into the matching text element, or vice-versa. In some embodiments, the fuzzy matching score may be a percentile-based score, in which an exact matching score of 100% is reduces by one percent for each operation required to transform the element of source text into the matching text element, or vice-versa. In some embodiments, the fuzzy match score application may ignore certain minor inconsistencies when calculating an editing distance, such as consecutive spaces. In some embodiments, the fuzzy match score application may associate a specific minimum editing distance penalty for transforming a first word to a second word when the first and second words each share a common word stem. For example, such a transformation may only entail a fuzzy match penalty of one percent.

In step 722, leveraging module 540 determines whether the fuzzy match score computed in step 721 for a particular matching text element is a high-fuzzy match score, for example between about 95% and 99%. If yes, method 700 proceeds to step 723; if no, method 700 proceeds to step 724.

In step 723, leveraging module 540 indicates that the matching text element is a high-fuzzy match of the element of source text. For example, metadata associated with the matching text element may be updated, so that a linguist 595 who receives the element of source text for translation will also receive the matching text element and the metadata indicating that the matching text element is a high-fuzzy match, but not an exact match.

In step 724, leveraging module 540 determines whether the fuzzy match score computed in step 722 for a particular matching text element is a medium-fuzzy match score, for example between about 85% and 94%. If yes, method 700 proceeds to step 725; if no, method 700 proceeds to step 726.

In step 725, leveraging module 540 indicates that the matching text element is a medium-fuzzy match of the element of source text. Thus, a linguist 595 who receives the element of source text for translation will also receive the matching text element and the metadata indicating that the matching text element is a medium-fuzzy match.

In step 726, leveraging module 540 indicates that the matching text element is a low-fuzzy match of the element of source text. Thus, a linguist 595 who receives the element of source text for translation will also receive the matching text element and the metadata indicating that the matching text element is a low-fuzzy match.

Implementation of method 700 enables the generation of a fuzzy match score for a particular matching text element and/or a designation of the particular matching text element as an exact match or in-context match of an element of source text. As a result, a matching score and/or other matching metadata can be included with each matching text element associated with an electronic document, thereby facilitating the manual translation of matching text elements that are not in-context matches for an element of source text.

As described herein, various functions are performed by localization platform 500. Such functions may be implemented as one or more applications executed by one or more computing devices associated with localization platform 500. For example, a document filtering application may be employed for extracting textual content from a variety of different electronic documents 531, a content segmentation application may be employed for separating extracted textual content into elements of source text, a search application may be employed for searching translation database 550 for matching text elements, a fuzzy match score application may be employed for performing a matching score analysis on matching text elements, and a quality check application may be employed to perform one or more quality checks on translated jobs 533 uploaded by a linguist 595. Such applications may be executed on content server 110 in FIG. 1, control server 120 in FIG. 2, and/or on a stand-alone computing device. One such computing device is described below in conjunction with FIG. 8.

Figure 8:
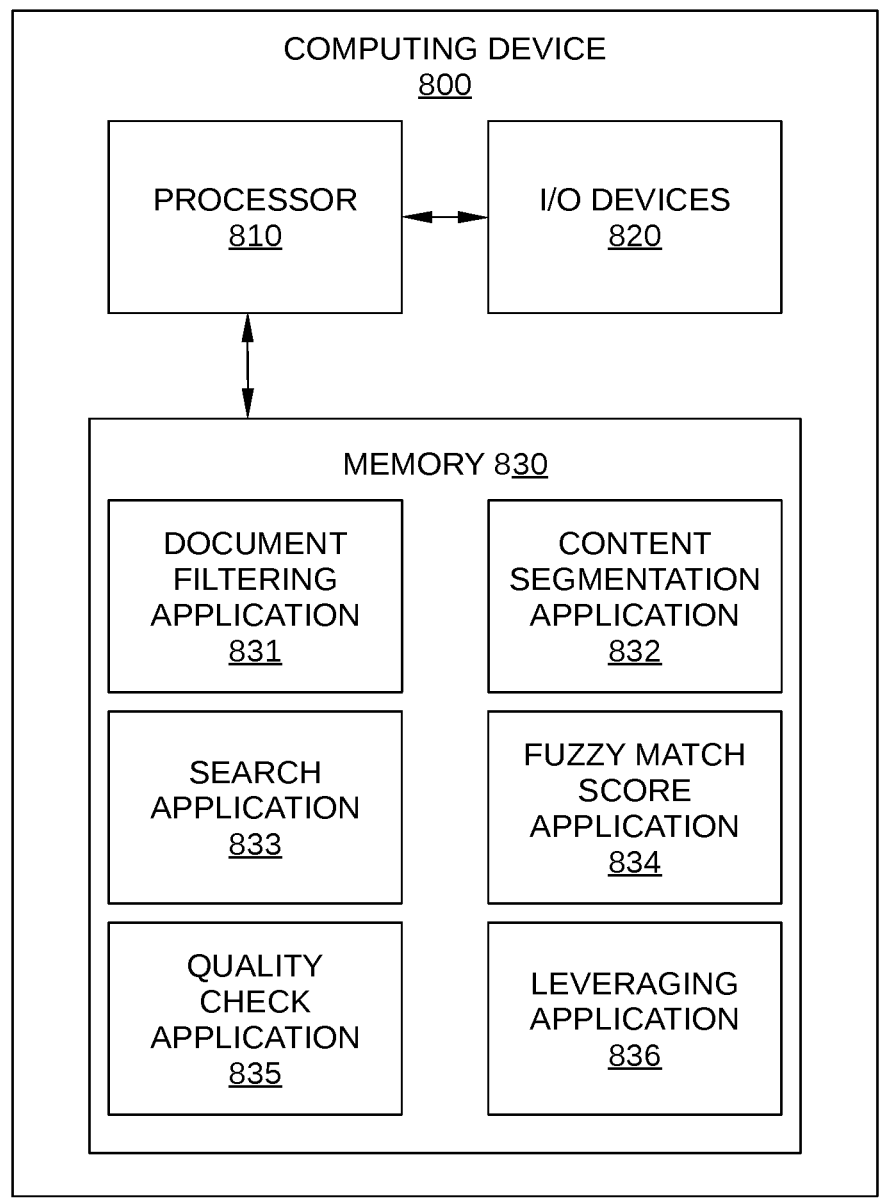
FIG. 8 is an illustration of a computing device configured to implement one or more functions of the localization platform of FIG. 5, according to various embodiments of the present invention.

FIG. 8 is an illustration of a computing device 800 configured to implement one or more functions of the localization platform of FIG. 5, according to various embodiments. Computing device 800 is configured to translate textual content and facilitate translation of textual content by executing one or more of a document filtering application 831, a content segmentation application 832, a search application 833, a fuzzy match score application 834, a quality check application 835, and/or a leveraging application 836, according to one or more embodiments of the present invention. Leveraging application 836 may include the functionality of any combination of document filtering application 831, content segmentation application 832, search application 833, fuzzy match score application 834, and/or quality check application 835.

Computing device 800 may be any type of device capable of executing application programs including, without limitation, instructions associated with document filtering application 831, content segmentation application 832, search application 833, fuzzy match score application 834, quality check application 835, and/or leveraging application 836. For example, and without limitation, computing device 800 may be a laptop, a tablet, a smartphone, etc. In the embodiment illustrated in FIG. 8, computing device 800 includes, without limitation, a processor 810, input/output (I/O) devices 820, and a memory 830.

Processor 810 may be implemented as a central processing unit (CPU), a graphics processing unit (GPU), an ASIC, an FPGA, any other type of processing unit, or a combination of different processing units. In general, processor 810 may be any technically feasible hardware unit capable of processing data and/or executing software applications to facilitate execution of document filtering application 831, content segmentation application 832, search application 833, fuzzy match score application 834, quality check application 835, and/or leveraging application 836, as described herein. Among other things, and without limitation, processor 810 may be configured to execute instructions associated with document filtering application 831, content segmentation application 832, search application 833, fuzzy match score application 834, quality check application 835, and/or leveraging application 836.

I/O devices 820 may include input devices, output devices, and devices capable of both receiving input and providing output. Memory 830 may include a memory module or a collection of memory modules. As shown, in some embodiments, some or all of document filtering application 831, content segmentation application 832, search application 833, fuzzy match score application 834, quality check application 835, and/or leveraging application 836 may reside in memory 830 during operation.

Computing device 800 may be implemented as a stand-alone chip, such as a microprocessor, or as part of a more comprehensive solution that is implemented as an application-specific integrated circuit (ASIC), a system-on-a-chip (SoC), and so forth. Generally, computing device 800 may be configured to coordinate the overall operation of a computer-based system. In other embodiments, computing device 800 may be coupled to, but separate from such a computer-based system. In such embodiments, the computer-based system may include a separate processor that transmits input to computing device 800, such as digital images and/or digital videos, and receives output from computing device 800. However, the embodiments disclosed herein contemplate any technically feasible system configured to implement document filtering application 831, content segmentation application 832, search application 833, fuzzy match score application 834, quality check application 835, and/or leveraging application 836, in any combination. In alternative embodiments, rather than being configured as a single machine, computing device 800 may be configured as a distributed computing system, such as a cloud-computing system. Alternatively or additionally, in some embodiments, rather than being configured as one or more stand-alone machines, computing device 800 may be associated with or included in one or more of content servers 110 and/or control servers 120 in FIG. 1. For example, and without limitation, the functionality of computing device 800 may be incorporated into CPU 204 of content server 110, shown in FIG. 2. In such embodiments, document filtering application 831, content segmentation application 832, search application 833, fuzzy match score application 834, quality check application 835, and/or leveraging application 836 may reside in one or more of content servers 110 and/or control servers 120 during operation.

In sum, a localization platform leverages previously translated textual content to reduce or eliminate how much manual translation is needed for new textual content that requires translation. For an element of source text that requires translation, the localization platform searches a database of previously translated text elements for a text element that is an exact match or a fuzzy match of the element of source text. The localization platform then provides a linguist with both the element of source text and the matching text element, so that the linguist can use the matching text element to assist in the manual translation process. In some embodiments, metadata that quantifies how closely the element of matching text matches the element of source text is also provided to the linguist.

At least one advantage of the disclosed techniques is that for new textual content that requires translation, previously translated textual content can be leveraged in an automated process to reduce or eliminate how much manual translation of the new textual content is needed.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

What is claimed is:

1. A computer-implemented method, comprising:
receiving from an external application a request to translate an element of source text from an origin language to a target language that is determined based on a geographical location where the source text is employed;
searching a database associated with the geographical location for an element of matching text in the origin language that at least partially matches the element of source text;
in response to determining that an element of matching text is found in the database:
reading from the database an element of previously translated text that is mapped to the element of matching text and includes at least one word that is translated into the target language; and
transmitting the element of source text, the element of matching text, the element of previously translated text, and a mapping between the element of source text and the element of matching text to a location for translation.

2. The method of claim 1, further comprising receiving from the location an element of newly translated text that corresponds to the element of source text.

3. The method of claim 2, further comprising:
performing a quality check on the element of newly translated text; and
if the element of newly translated text fails the quality check, returning the element of newly translated text to the location for correction, or
if the newly translated text passes the quality check, updating the database to include the element of source text, the element of newly translated text, and a mapping of the element of source text to the element of newly translated text.

4. The method of claim 2, further comprising transmitting the element of newly translated text to an application that transmitted the request to translate.

5. The method of claim 2, further comprising updating the database to include the element of source text, the element of newly translated text, and the mapping of the element of source text to the newly translated text.

6. The method of claim 1, wherein searching the database for the element of matching text comprises searching the database for an element of text that is an in-context match of the element of source text, an out-of-context match of the element of source text, or a fuzzy match of the element of source text.

7. The method of claim 1, wherein an element of matching text is found in the database, and further comprising calculating a matching score that quantifies how closely the element of matching text matches the element of source text; and generating metadata associated with the element of matching text that includes the matching score.

8. The method of claim 7, wherein the matching score includes one of an indicator designating the element of matching text as an in-context match of the element of source text, an exact out-of-context match of the element of source text, or a fuzzy match of the element of source text.

9. The method of claim 7, wherein the matching score includes an indicator designating the element of matching text as a fuzzy match of the element of source text and metadata indicating what portion of the element of matching text does not match the element of source text.

10. The method of claim 7, further comprising transmitting the metadata to the location with the element of previously translated text.

11. The method of claim 7, wherein the matching score is based on an editing distance between the element of source text and the element of matching text.

12. A non-transitory computer-readable storage medium including instructions that, when executed by a processor, cause the processor to perform the steps of:
receiving from an external application a request to translate an element of source text from an origin language to a target language that is determined based on a geographical location where the source text is employed;
searching a database associated with the geographical location for an element of matching text in the origin language that at least partially matches the element of source text;
in response to determining that an element of matching text is found in the database:
reading from the database an element of previously translated text that is mapped to the element of matching text and includes at least one word that is translated into the target language; and
transmitting the element of source text, the element of matching text, the element of previously translated text, and a mapping between the element of source text and the element of matching text to a location for translation.

13. The non-transitory computer-readable storage medium of claim 12, wherein receiving the request to translate the element of source text comprises receiving a block of source text that includes multiple phrases or sentences, the method further comprising separating the block of source text into multiple elements of source text that each include a single sentence or phrase.

14. The non-transitory computer-readable storage medium of claim 12, wherein receiving the request to translate the element of source text comprises receiving a block of text in the origin language that is embedded in an electronic document, the method further comprising extracting the block of text from the electronic document, wherein the element of source text includes at least a portion of the block of text.

15. The non-transitory computer-readable storage medium of claim 12, wherein the element of source text includes a multi-word phrase or sentence in the origin language.

16. The non-transitory computer-readable storage medium of claim 12, further comprising receiving from the location an element of newly translated text that corresponds to the element of source text.

17. The non-transitory computer-readable storage medium of claim 16, further comprising:
performing a quality check on the element of newly translated text; and
if the element of newly translated text fails the quality check, returning the element of newly translated text to the location for correction, or
if the newly translated text passes the quality check, updating the database to include the element of source text, the element of newly translated text, and a mapping of the element of source text to the element of newly translated text.

18. The non-transitory computer-readable storage medium of claim 16, further comprising transmitting the element of newly translated text to an application that transmitted the request to translate.

19. The non-transitory computer-readable storage medium of claim 16, further comprising updating the database to include the element of source text, the element of newly translated text, and the mapping of the element of source text to the newly translated text.

20. A system, comprising:
a memory storing a leveraging application; and
a processor that is coupled to the memory and, when executing the leveraging application, is configured to:
receive from an external application a request to translate an element of source text from an origin language to a target language that is determined based on a geographical location where the source text is employed;
search a database associated with the geographical location for an element of matching text in the origin language that at least partially matches the element of source text;
if an element of matching text is found in the database, then:
read from the database an element of previously translated text that is mapped to the element of matching text and includes at least one word that is translated into the target language; and
transmit the element of source text, the element of matching text, the element of previously translated text, and a mapping between the element of source text and the element of matching text to a location for translation.

* * * * *

UNITED STATES PATENT AND TRADEMARK OFFICE
CERTIFICATE OF CORRECTION

PATENT NO. : 10,303,777 B2
APPLICATION NO. : 15/231725
DATED : May 28, 2019
INVENTOR(S) : Ballav Bihani et al.

It is certified that error appears in the above-identified patent and that said Letters Patent is hereby corrected as shown below:

On the Title Page

Item [72], insert --Shashidhara Mathada, Santa Clara, CA (US)--.

Signed and Sealed this
Third Day of February, 2026

John A. Squires
*Director of the United States Patent and Trademark Office*